Figure 1:
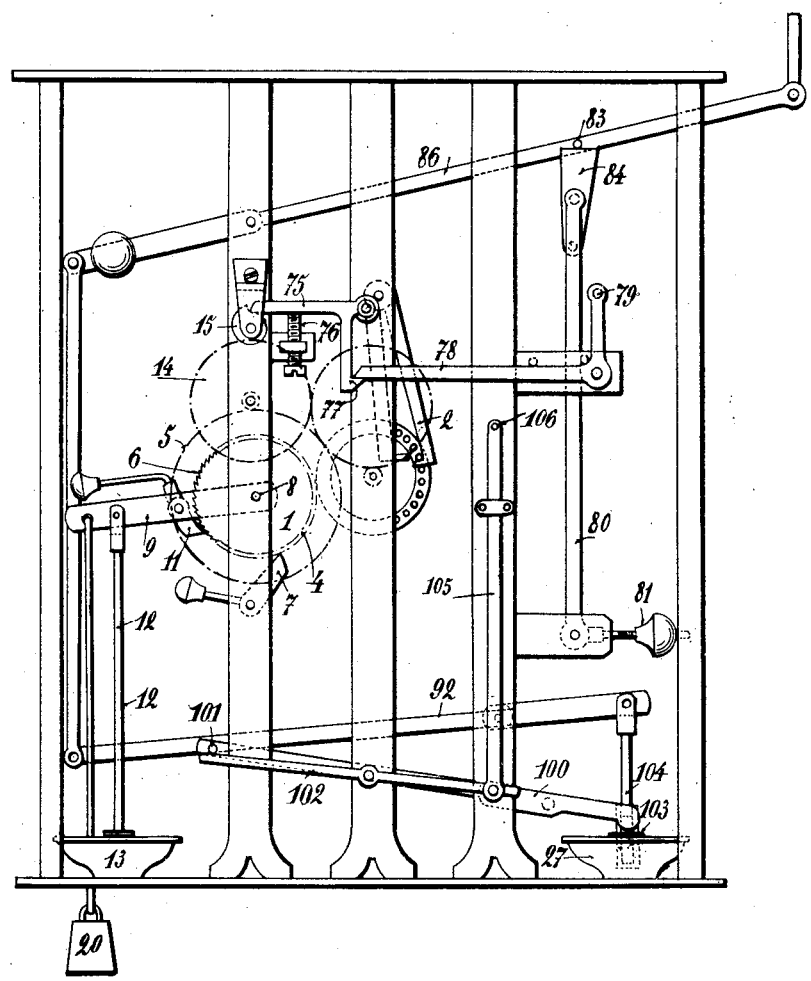

P. POETTO.
PNEUMATIC CLOCK.
APPLICATION FILED MAR. 18, 1909.

998,923.

Patented July 25, 1911.
3 SHEETS—SHEET 1.

Witnesses:
E. Breil.
Mas Hamku

Inventor:
Pierre Poetto.
per Ferdinand Westermann
Attorney.

COLUMBIA PLANOGRAPH CO., WASHINGTON, D. C.

P. POETTO.
PNEUMATIC CLOCK.
APPLICATION FILED MAR. 18, 1909.

998,923.

Patented July 25, 1911.
3 SHEETS—SHEET 2.

Witnesses:
E. Briel.

Inventor:
Pierre Poetto.
per Ferdinand Westermann
Attorney.

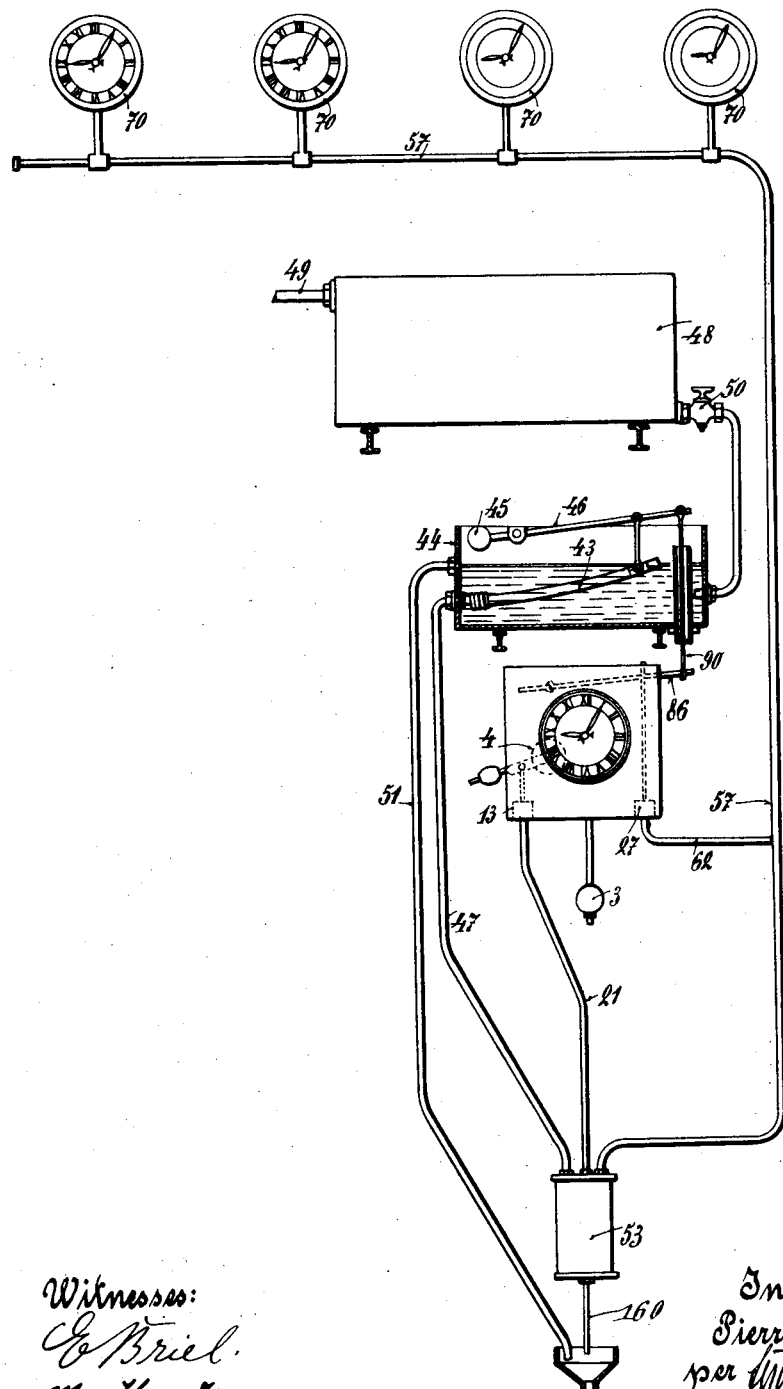

UNITED STATES PATENT OFFICE.

PIERRE POETTO, OF PARIS, FRANCE.

PNEUMATIC CLOCK.

998,923. Specification of Letters Patent. Patented July 25, 1911.

Application filed March 18, 1909. Serial No. 484,219.

*To all whom it may concern:*

Be it known that I, PIERRE POETTO, mechanical engineer, subject citizen of the Kingdom of Italy, residing at 4 Rue Pajol, Paris, France, have invented certain new and useful Improvements in Pneumatic Clocks; and I do hereby declare the following to be a full, clear, and exact description of the invention, such as will enable others skilled in the art to which it appertains to make and use the same.

The object of this invention is to communicate, by means of a hydro-pneumatic iso-synchronic device and a system of air pipes, the time from a regulator to any desired number of secondary clocks or receivers connected with said system of air pipes. This communication is effected by means of an impact of air which is produced in one or more air vessels through the sudden admission of a certain quantity of water, whereby said impacts, under the influence of the regulator, are repeated at determined periods (in the given example, every 60 seconds). By the effect of this impact of air the bellows of the receivers become inflated and operate the displacement of the hand to the extent of one division (every minute).

The device is distinguished by the following characteristics:—The more or less heavy pressure of the water entering from the outside and even the absence of inflow during 24 hours, produces no influence whatever upon the function of the device, inasmuch as two vessels are provided, the larger of which conveys its contents to the smaller, so that the inflow and outflow is so calculated that the water-level in the small vessel remains always the same. The distribution of the water in each or both vessels is effected without cocks and without any other power than that of the regulator. The winding-up of the clock and the operation of distributing by the regulator take place absolutely automatically. The admission of water into the vessel lasts until the pressure of the air has risen to a point when the receivers operate safely. As soon as said pressure has been attained the inflow of water ceases automatically and the water flows out through an outlet without ever reaching the air passages. Said sudden inflow of water into the vessel or vessels not only operates the displacement of the hands of all the receivers, to the extent of one minute, and the automatic winding up of the regulator, but it also brings about the return of all the parts to their original position. The impact of air is transmitted to the receivers by means of a device which secures the position of the hand exactly in accordance with the division of the respective indicators without it being possible for any interruptions or accelerations in the progress of the hands to occur.

The accompanying drawings illustrate the communicating devices.

Figure 2:
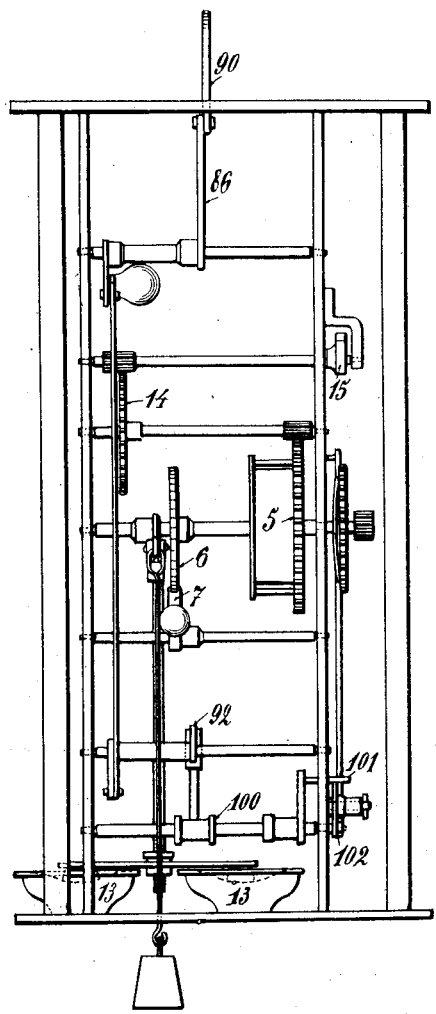
Figure 3:
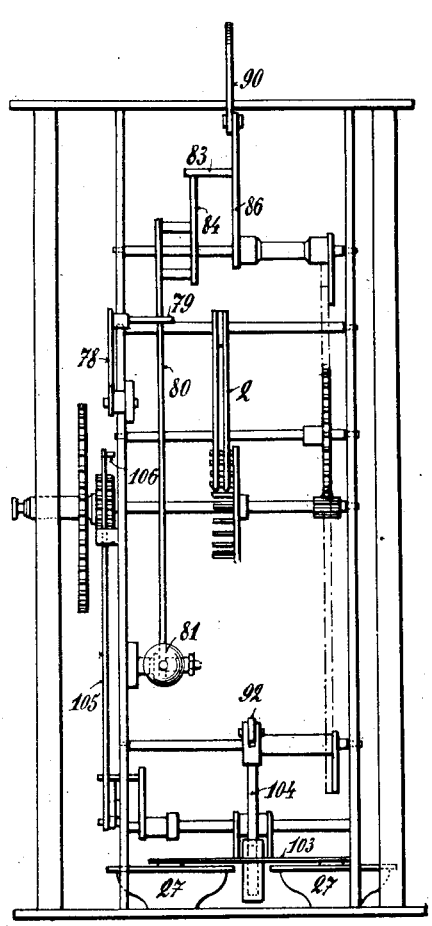

Figure 1 represents a view of the works of the regulator, Fig. 2 is a view from the left side, and Fig. 3 a view from the right side of Fig. 1; Fig. 4 is a diagram of the whole communicating device.

The whole arrangement includes: The works of the automatically wound regulator, a water distribution, a double hydro-pneumatic transmission and a number of receivers or secondary clocks. The works of the regulator consist of 2 different sets of parts which work jointly, in order to assure iso-synchronism in the transmission of the motions of the regulator or principal clock to the secondary clocks, while separately one operates the minute works of the regulator and the other the distribution of the water here used as motive power. The sets of parts actuating the minute works of the regulator consist of wheel works which, on the one hand, are operated by the motive power of a spiral spring and on the other hand by the regulating action of the escapement 2 of ordinary construction and of a pendulum in the usual manner.

4 is a case inclosing the spring and connected with one of the wheels 5 of the minute works. The interior end is attached to the shaft of a ratchet wheel 6 which is held in the wound-up position by a click 7 with the counter weight. Upon the spring case 4 and the shaft 8 carrying the ratchet wheel 6, a lever 9 is freely suspended with an articulated click 11 with counter weight which engages the ratchet wheel 6. A rod 12 connects the lever 9 with membrane air bags 13, in which at regular intervals of time, an air pressure originated from the receptacle 53 through the passage 21, is admitted for the purpose of raising the lever 9. With this up and down motion of the lever 9, the click 11 of the same slides over a number of teeth of the ratchet wheel 6. Thus upon the pressure in the bellows 13 being released, the lever 9, driven down by the weight 20, rotates by the means of the click 11 the wheel 6 around the corresponding number of teeth and winds up the spring 1. The intermediate wheel 14 in the works of the regulator is rotated by the spring, while 15 is a spiral tappet wheel which performs one revolution in definitive intervals of time of, say, one minute each.

The equipoised arm of the rectangular bell-crank lever 75 works in harmony with the tappet wheel 15, which lever engages an adjusting screw 76 and the vertical arm of which is directed downward and is furnished with a catch 77 upon which rests an arm of another rectangular double lever 78. The catch 77 of the lever 75 is so arranged that the weight of the lever 78 tends to press the lever 75 either upon the adjusting screw 76 or upon the tappet wheel 15. The other arm of the lever 78 is directed upward and carries a pin 79 which is so arranged that it strikes the vertical arm of the third lever 80 which is actuated by a counterweight 81. The upper end of the vertical arm of the lever 80 carries a catch 84 upon which rests the pin 83 of a lever arm 86. A connecting rod 90 extends from the lever arm 86 to the plunger pipe 43, which outbalances in its swinging motion a counter weight 45 and tends to plunge into the water. The release of the lever arm 86 which permits the plunger pipe 43 to plunge into the water (Fig. 4) is actuated by the coöperation of the tappet wheel 15 of the angular lever 75 and of the bell crank lever 78. The pin 79 upon the lever 78 falling from the catch 77 of the lever 75, strikes the upper edge of the lever arm 80. When the release takes place, the air bags being deflated, the lever arm 86 is brought down by the weight of the plunging pipe 43 and its pin 83 takes a place laterally along arm 80 at the lower part of the inclined surface of the catch 84. The arm 80 carries the catch 84 sufficiently high so that when the lever arm 86 goes down, the pin 83 does not come in contact with the pin 79. In consequence of the dipping of the pipe 43 into the water of the vessel 44, the water pours through the channel 47 into the air vessel 53 and drives out the air therefrom through the system of pipes 57 into the secondary clock 70.

The water vessel 44, the level of which must be kept constant is fed from a larger vessel 48, 49 being the supply pipe to the vessel 48. The water supply from the vessel 48 is so regulated by the regulation cock that the filling of the vessel 44 is completed before the taking place of the outflow of the water which said vessel has to give up upon each release of the device.

In the vessel 44 an overflow 51 is provided so that the water level therein never exceeds the desired height. The lower vessel 44 could also of course be furnished direct with a floating cock, but it appears preferable to use an auxiliary vessel 48 in order to avoid the accidents that might occur if the floating cock did not work properly.

The raising of the lever arm 86 and of the plunger pipe 43 to its original position is effected by the action of two membrane air bags 27 in which the air pressure takes place by means of a lateral branch 62 of the system of pipes 57, if it has actuated the secondary clocks. The membranes of the air bags 27 raise the arm of the intermediate lever 100, the other arm of which upon recession with its pin 101, presses against the other end of the lever arm 102. A vertical articulated rod 105 carries at its upper end a pin 106 which upon the rising of the rod 105 engages under the lever 78, this raises the same and brings it again into engagement with the catch 77. This arrangement of the intermediate lever arms 100 and 102 has for its object the multiplication of the cross lug 103 of the two air bags 27. Said air bags also operate a rod 104, which actuates the short arm of the lower lever arm 92, in order to raise the plunger pipe. The rod 104 slides freely in a case of the cross lug 103, if the latter goes down, upon the air pressure in the double air bag 27 being stopped. Owing to the rise of the plunger pipe 43, the ingress of water into the vessel 53 ceases. If the number of the secondary clocks to be actuated necessitates it, it is also possible to arrange two or more vessels 53.

When the lever 78 comes into engagement with the catch 77, the tappet wheel 15 is brought into the position in which the lever 75 can contact with the adjusting screw 76. The various parts are then ready to enter into operation again which takes place as soon as the tappet of the wheel 17 has sufficiently raised the lever 75 to release the lever 78. The screw 76 permits such an arrangement, at the commencement of the raising of the lever 75, that said raising is terminated immediately before the moment when the tappet of the wheel 15 releases the lever 75.

The plunging-pipe 43 has an inner diameter of 12 mm., the channel 47 an inner diameter of 2 mm. and the outlet pipe 160 is of smaller diameter. If the plunging-pipe 43 is lowered in the receptacle 44, the water flows very rapidly through the channel 47 into the air-chamber 53 and covers at once the small opening of the outlet pipe and starts also to run off slowly. The air pressed out of the air chamber passes through the pipe connection 57 to the receivers, moves the hands of these one minute and acts nearly simultaneously through the pipe connection 62 on the bellows, which actuates the rising of the plunging pipe, whereby the water-flow through the pipe 47 is closed.

Up to the next lowering of the plunger-pipe there remains ample time to allow the water to flow off through the small pipe 160. It can therefore be seen that the strong flow of water, which the small outlet pipe cannot resist lasts only until the receivers are actuated, that is only a few seconds after which it stops immediately and that there is enough time up to the full minute to allow the water to flow off. According to the number of receivers the above dimensions have to be changed somewhat.

The pendulum regulates the main clock only and has nothing to do with the present invention.

Having now fully explained my invention and the manner in which it is to be set forth I declare that what I claim is:—

1. In pneumatic clocks, two membrane air bags, a water vessel, an air vessel, means whereby the inflow of water forces the air out of the air vessel and conducts the air pressure to the bags, a pipe within said water vessel, and a multiplying lever mechanism actuated by said membrane air bags for raising the pipe.

2. In pneumatic clocks, two membrane air bags, a water vessel, an air vessel, means whereby the inflow of water forces the air out of the air vessel and conducts the air pressure to the bags, a pipe within said water vessel, and a multiplying lever mechanism actuated by said membrane air bags for raising the pipe, and for returning all of the parts to their normal position.

PIERRE POETTO.

Witnesses:
H. C. COXE,
HENRI COUMEUR.

Copies of this patent may be obtained for five cents each, by addressing the "Commissioner of Patents, Washington, D. C."